United States Patent [19]

Williams

[11] Patent Number: 4,925,002
[45] Date of Patent: May 15, 1990

[54] CONVEYORIZED SORTATION SYSTEM

[76] Inventor: John C. Williams, 770 Sweetbrier Dr., Memphis, Tenn. 38119

[21] Appl. No.: 367,871

[22] Filed: Jun. 19, 1989

[51] Int. Cl.$^5$ .............................................. B65G 47/12
[52] U.S. Cl. ................................... 198/445; 198/569; 198/836; 209/900
[58] Field of Search ............... 198/445, 569, 570, 644, 198/836; 209/900, 925, 942

[56] References Cited

U.S. PATENT DOCUMENTS

| 3,083,810 | 4/1963 | Zebarth et al. | 198/836 |
| 3,554,353 | 1/1971 | Raudat | 198/836 |
| 4,162,727 | 7/1979 | Summers | 198/836 |
| 4,337,866 | 7/1982 | Suling et al. | 209/942 |

FOREIGN PATENT DOCUMENTS

| 1105342 | 4/1961 | Fed. Rep. of Germany | 209/900 |
| 1196499 | 11/1959 | France | 209/900 |
| 824414 | 12/1959 | United Kingdom | 209/900 |
| 919716 | 2/1963 | United Kingdom | 209/900 |

Primary Examiner—Joseph E. Valenza
Attorney, Agent, or Firm—John J. Mulrooney

[57] ABSTRACT

A conveyorized sorting and distribution system for the handling of packages of documents or other items includes an infeed conveyor in tandem with an inclined conveyor and a plurality of vertically adjustable conveyor divider plates positioned above the infeed and inclined conveyors to divide the conveying surfaces into a plurality of individual sorting lanes. The infeed and inclined conveyor belts have a plurality of longitudinal grooves therein which may be created by and are aligned with the divider plates which extend into said grooves. A conveyor end divider transition section positioned at the end of the inclined conveyor enables the conveyed materials to flow by means by gravity to a distribution transition section that includes a chute for each lane of conveyed materials. The distribution transition section provides for the optimum conveying angle for gravity flow of the conveyed materials and also provides the necessary direction changes to distribute the materials to the desired discharge chute. A plurality of discharge chutes receive the conveyed materials at the end of the distribution transition section and discharges the conveyed materials into receptacles.

6 Claims, 4 Drawing Sheets

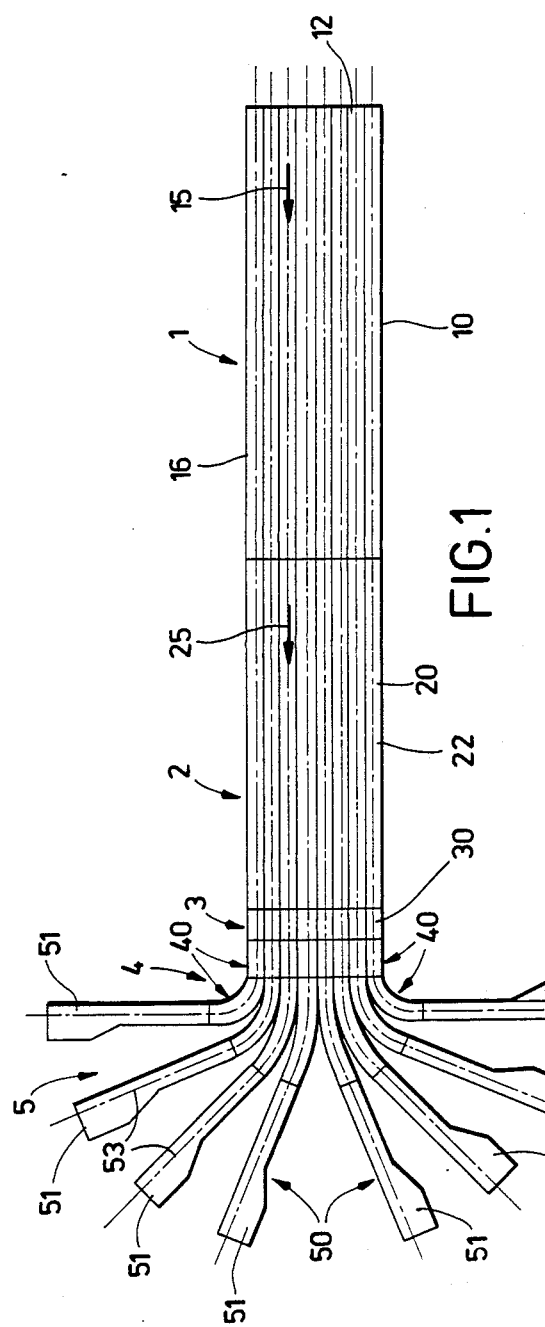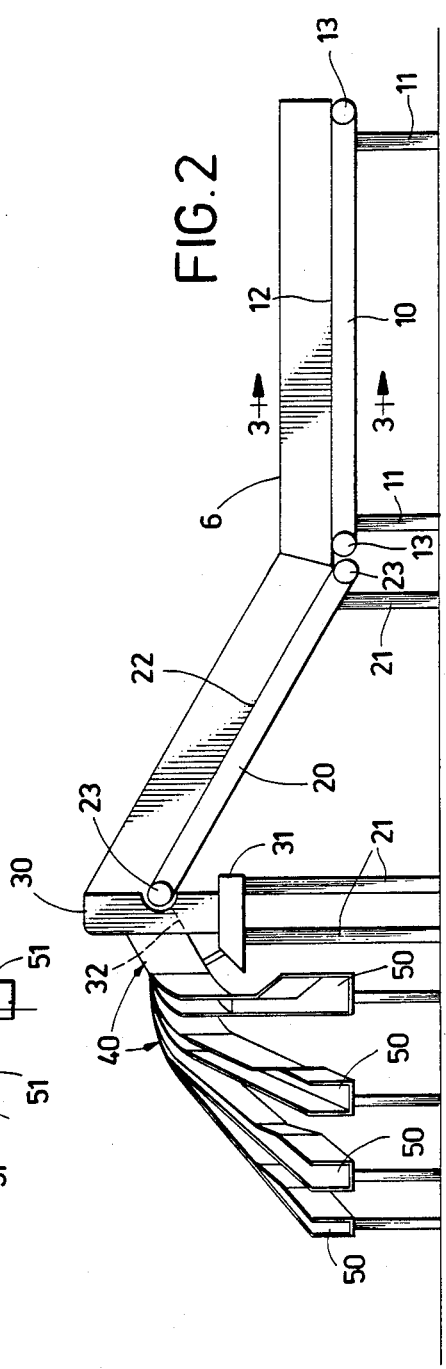

CONVEYORIZED SORTATION SYSTEM

BACKGROUND OF THE INVENTION

This invention relates to apparatus for sorting, conveying and distributing items, and in particular to a sorting, conveying and distributing system for the handling of rigid or flexible packages of documents, or loosely packaged documents, and for allowing the positioning, distribution and accumulation of these packages for subsequent handling.

In recent years, the overnight courier and package delivery industry has grown to the point where the companies have a relatively short period of time to collect, sort and deliver hundreds of thousands of packages in order to meet the promised next day delivery deadline.

The industry quickly outgrew the capacity of manual sortation systems and attempted to adapt known sortation-conveyor systems to solve the enormous sorting and conveying work load. The prior art sorting and conveying systems comprised divided, multi-laned conveyors having separate belts and dividers which conveyed the packages to chutes that had to be configured to meet the needs of the conveyor system. The prior art apparatus was found to be inefficient and noneconomical with respect to an optimum layout for the use of man power and space. One specific complaint against adaptation of the prior art apparatus to the overnight package delivery industry was that the layout of the sorting-conveying apparatus was dictated by the equipment which required excessive space to accomplish the sortation-conveying process. Moreover, in order to prevent jamming of loosely packaged or flexible packages of documents, the prior art apparatus required multiple belt, complicated mechanical conveying systems which were uneconomical and inefficient with respect to the use of space, man power and cost. Another problem with the prior art systems was that they did not allow for the placing of the discharge and collection points in the best positions for the utilization of man power and space. See for example U.S. Patent Nos. 4,047,712; 3,032,211: 2,833,393; and 2,679,309 for prior art sorting-conveying systems having features which were adapted for use in the overnight package delivery industry with limited success.

Another problem resulting from the use of prior art sorting-conveying systems relates to the particular type of material used by numerous courier service companies to make their envelopes. The material is spun bonded olefin which is very strong and durable, but which becomes flimsy, pliable and dogeared with repeated handling whereby the envelope develops numerous edges or corners which are susceptible to catching on protrusions or in cracks while being conveyed. The prior art systems have numerous places and cracks where the edges and corners of such packages may catch and cause a jam. For example, the space between the lane dividers and the conveyor belts immediately below were a continuous source of jams and stoppages in the prior art systems. Also, the prior art systems were not designed to eliminate such cracks and other potential problem points where jams and stoppages could occur in the system between the conveyor belt and the collection point. The prior art systems had no convenient means for clearing a jam which occurred at points in the system past the conveyor surfaces.

Therefore, a need has developed for a sorting, conveying, and distributing system for the handling of packages which are susceptible to snagging on the conveyor surface and causing jams, or which are susceptible to failure whereby the contents will be spilled and cause a jam.

SUMMARY OF THE INVENTION

It is a general object of this invention to provide a conveying and sorting means for envelopes and packages made from spunbonded olefin, or other similar materials, without damage, jamming, or delay.

Another object of the invention is to provide a conveying and sorting system which is capable of handling envelopes or packages made from any flexible or rigid packaging material.

The new and improved conveyorized sorting and distribution system of the present invention comprises an infeed conveyor and an inclined conveyor in tandem and having a plurality of conveyor divider plates mounted above said conveyor surfaces for dividing said surfaces into a plurality of sorting lanes. The conveying surfaces have grooves therein immediately below the divider plates which extend into the grooves. A divider transition section conveys the packages from the inclined conveyor to a distribution transition section which introduces the packages to the individual discharge chutes where they are conveyed to receptacles.

The objects are accomplished by the configuration of the components, the design of the components, and the method of construction which prevent the packages from becoming jammed or in any other manner damaged or stuck in the apparatus for conveying and sorting. This invention has eliminated the points in the flow path of the conveyed packages where jamming might occur. The conveyor system provides for the packages to travel with no access to crevices and the gravity transition sections are constructed so that no jamming can occur.

BRIEF DESCRIPTION OF THE DRAWINGS

FIG. 1 is a plan view of the conveyorized sorting and distribution system of the present invention.

FIG. 2 is a side elevational view of the invention.

DESCRIPTION OF THE PREFERRED EMBODIMENTS

Figure 3:
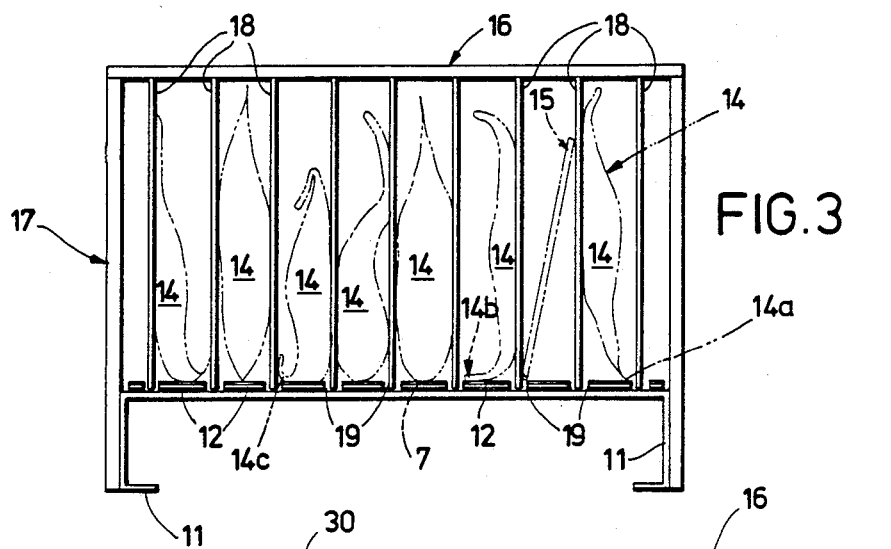
FIG. 3 is a sectional view of the conveyor belt showing the grooves therein and the position of the conveyor divider plates relative thereto taken along the line 3—3 of FIG. 2.

Referring to FIG. 1, the five (5) basic sections of the conveyorized sorting and distribution system of the present invention are indicated as follows: I indicates the infeed conveyor section comprising a conveyor belt which is divided into a plurality of sorting lanes into which the packages are initially placed for sortation; II indicates an inclined conveyor section in tandem with the infeed conveyor and containing the same number of sortation lanes, and which functions to elevate the packages to a height to insure gravity flow movement in the part of the system past the conveyor belts; III indicates a conveyor end divider transition section which functions to allow the packages to move from the conveyor belts to a plurality of discharge chutes aligned with the individual sortation lanes, the discharge chutes having an optimum angle of discharge. The conveyor end divider transition section is designed to allow easy access to the packages therein in the unlikely effect of a jam or failure of the packaging material. The conveyor end divider transition section is attached to the lane conveyors and integrates the conveyors to the discharge system and provides for a first change in direction of the conveyed packages at the optimum attitude for proper and consistent gravity flow. IV indicates a distribution transition section which provides for the distribution of the conveyed packages into the appropriate number of discharge points. The distribution transition section provides for the continued movement of the packages at the optimum attitude and angle for gravity flow and permits the downstream discharge chutes to be identical. V indicates the discharge section comprising a plurality of discharge chutes which permit the packages to be discharged into receptacles. The discharge chutes may be identical in design and dimension and allow the conveyed packages to be at the optimum attitude for proper handling. The discharge chutes also provide for the conveyed materials to be laid flat for stacking and subsequent handling. This lay down feature provides for the conveyed materials to always be orientated in the same direction for ease of label or identification reading.

Referring to FIGS. 1 and 2, the apparatus of the present invention comprises an infeed conveyor generally designated by the numeral 10. The conveyor means 10 may be of substantially any typical construction known to those skilled in the art such as a belt-type conveyor having floor supports 11, a belt 12 for defining a package-supporting surface, and a plurality of driving and idler rollers 13 for driving and/or supporting the belt 12 in any manner apparent to those skilled in the art. The belt 12 may be driven in any manner apparent to those skilled in the art such as by way of a typical drive motor (not shown) to cause packages 14 thereon to move in the direction of the arrow 15.

II indicates an inclined conveyor which is positioned in tandem with the infeed conveyor 10 to receive the conveyed packages therefrom and to elevate the packages to a height sufficient to enable gravity to distribute the packages as hereinafter described. Of course, inclined conveyor 20 would not be needed in the event that the place of installation permitted the infeed conveyor 10 to be positioned at a sufficient height with respect to the divider transition section, conveyor divider transition section, and the discharge section whereby gravity would permit the distribution of the packages leaving the infeed conveyor.

The inclined conveyor comprises floor supports 21, a belt 22 for defining a package-supporting conveyor surface, and a plurality of driving and idler rollers 23 for driving and supporting the belt 22 in a manner that will be apparent to those skilled in the art. The belt 22 may be driven in any manner apparent to those skilled in the art such as by way of a typical drive motor (not shown) to cause the packages 14 to move in the direction of the arrow 25.

Referring to FIGS. 1, 2 and 3, the conveyor surfaces 12 and 22 are divided into sort lanes by an adjustable six position conveyor divider plate apparatus comprising an adjustable height frame having a horizontal member 16, support members 17 and a plurality of dividers 18 which divide the conveyor surfaces into a plurality of sorting lanes. The conveyor surface 12 has grooves 19 therein which align with and receive the bottom ends of the dividers 18. The conveyor surface 22 of the inclined conveyor also has grooves therein (not shown) which align with and receive the bottom ends of the dividers 18 which are positioned above such grooves. The conveyor divider plate apparatus is vertically adjustable to allow the dividers to be adjusted downwardly to contact the belts to machine the grooves 19 in the surfaces 12 and 22 of the conveyor belts; or the grooves 19 may be machined by other appropriate means prior to assembly. The six position divider plates also are capable of longitudinal and horizontal movement with respect to the conveyor belt surfaces in order to adjust the divider plates to provide sort lanes having the desired width and eliminate spaces and cracks between the divider plates and the other parts of the system where packages might become jammed.

Referring to FIG. 3, the conveyor surface 12 is shown divided into eight (8) lanes by divider plates 18. Seven (7) of the lanes contain packages made from the material spunbonded olefin which has a tendency to become flimsy with repeated handling to form edges and ends such as illustrated at 14A, 14B and 14C which are susceptible to snagging between the divider plates and the conveyor belts in the prior art systems. The present invention avoids this problem by providing the grooves 19 in the conveyor belt which eliminates the cracks between the divider plates and the belts which was one of the places in the prior art systems where such packages became jammed and snagged. One (1) of the sort lanes contains a rigid package such as illustrated at 15.

Figure 4:
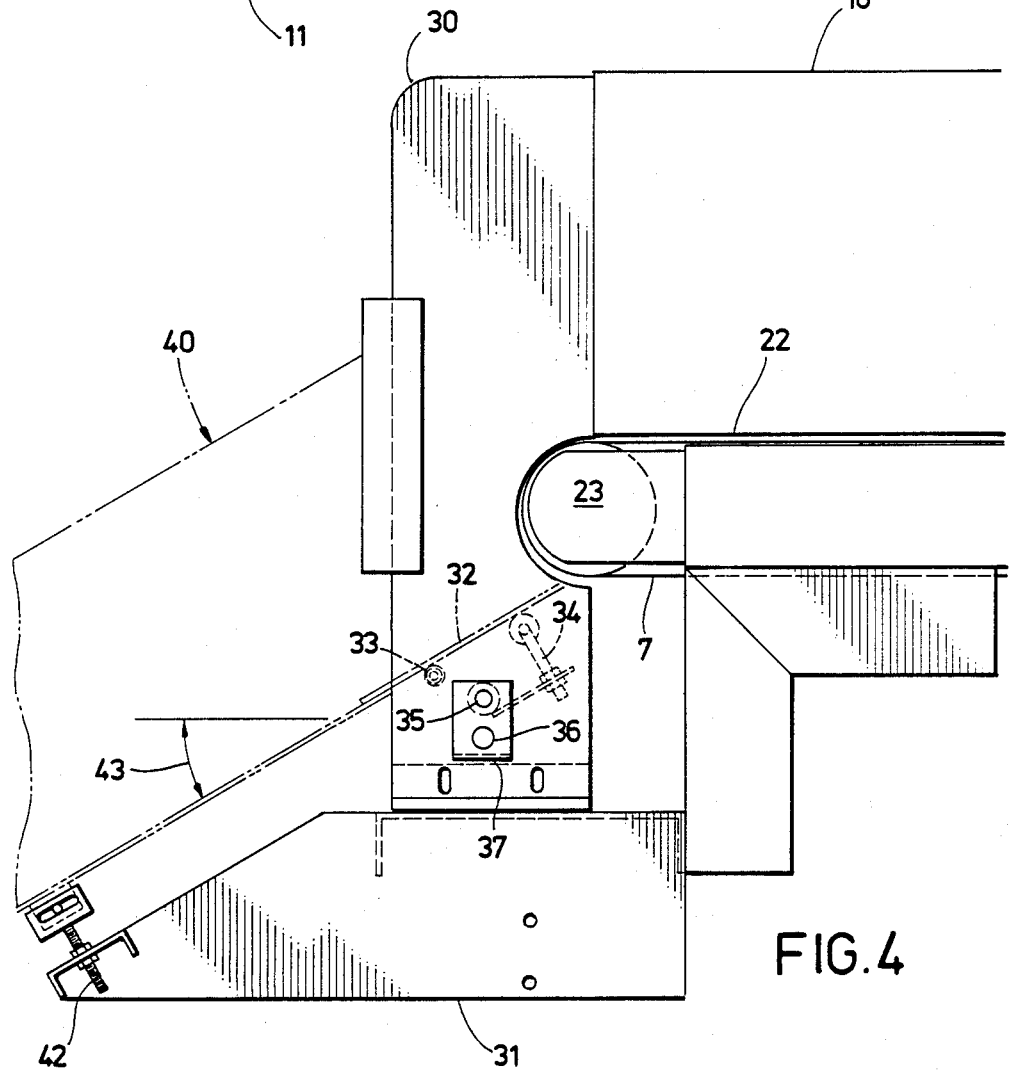
FIG. 4 is a partial side elevational view showing the conveyor end divider transition section.
Figure 5:
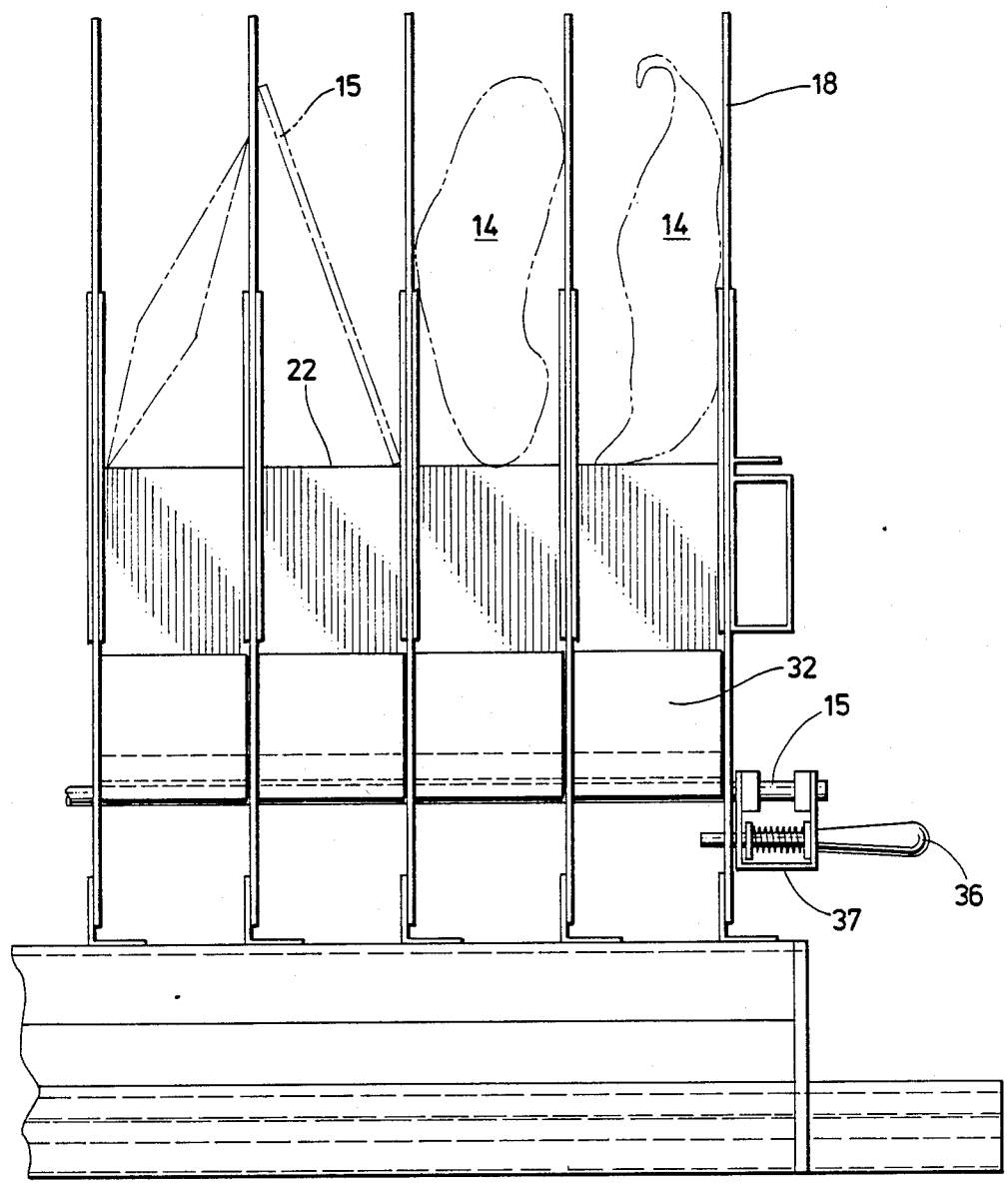
FIG. 5 is a partial sectional view showing the conveyor divider transition section.
Figure 6:
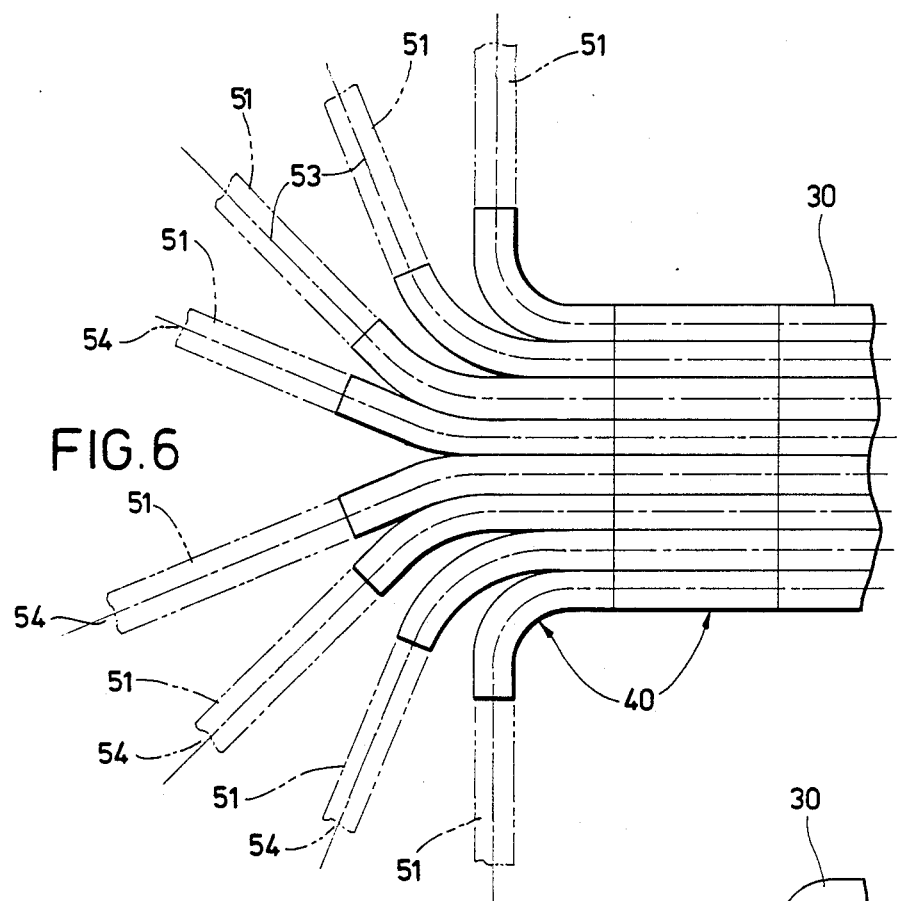
FIG. 6 is a partial sectional view showing the discharge section of the apparatus.
Figure 7:
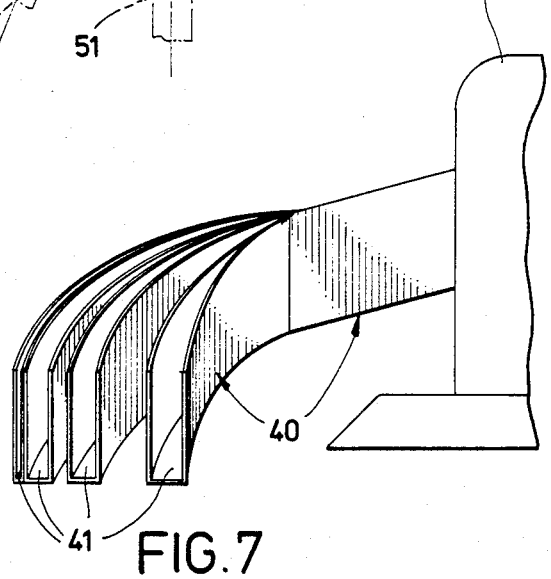
FIG. 7 is a partial sectional view showing the distribution transition section of the invention.

Referring now to FIGS. 4 and 5, the end divider transition section indicated by III is shown in detail. In prior art systems, the transition section between the conveyor surface and the distribution and discharge sections posed a problem because of the many potential jamming surfaces therein and because of the tendency for the packages to fail because of the handling. Jams and failures of the packages in the prior art systems at this point where particularly troublesome because of the delay and the inability to quickly clear such a jam. The present system avoids the problem of the prior art by providing a novel divider transition section which quickly and safely conveys the packaged material without exposing the packages to edges or crevices for snagging; and further, provides a convenient means for clearing a jam caused by failure of a package at this point.

The conveyor end divider transition section is generally designated by the reference numeral 30 and is attached to the inclined conveyor 20 by means of a support structure 31 mounted on floor supports 21. The conveyor end divider transition section 30 provides a smooth transition without snags and jams for the conveyed items 14 from the inclined conveyor 20 to the distribution transition section IV hereinafter described. The conveyor end divider transition section 30 comprises an access plate 32 that is hinged to rotate to allow for easy access to the conveying path for maintenance and clearing of jams caused by a failure of the package material. The conveyor end divider transition section 30 is designed and constructed to allow the conveyed materials 14 to flow by means of gravity and is designed to maintain the optimum angle for package flow and prevention of jamming.

The access plates 32 located in each sort lane are supported by, and are free to pivot around, an access plate pivot shaft 33. The access plates 32 are maintained in their normal operating position by an access plate support assembly 34. The support assemblies 34 are attached to a common pivot shaft assembly 35 and each support assembly 34 is individually adjustable. All of the support assemblies 34 are pivoted simultaneously by operating a spring-loaded pivot release handle 36, which is attached to the pivot shaft 35 by means of a yoke assembly 37.

A distribution transition section generally designated by the reference numeral 40 is attached to the downstream end of the conveyor end divider transition section 30 to receive the packages flowing therefrom. The distribution transition section 40 consists of a plurality of chutes to receive the packages and convey the packages in a pre-determined geometric configuration to the discharge chutes 50 hereinafter described. The distribution transition section 40 is designed to provide for the optimum conveying angle for gravity flow of the packages with no points or crevices for snags or jams to occur, and also provides for the necessary direction changes to distribute the material to the individual discharge chutes 50. The distribution transition section 40 is connected at one end to the conveyor end divider transition section 30 and at the other end to the discharge chutes 50, and is supported by an adjustable support 42.

The packages flow from the distribution transition section 40 to the individual discharge chutes 50 which allow the packages to continue flowing at the optimum conveying angle without snags and jams. The discharge chutes 50 have a "lay-down" device (not shown) to insure that the packages are properly aligned for speed of handling and recognition. The center lines of the discharge chutes 51, the distribution transition section 40 chutes 41, the conveyor end transition section lanes and the sort lanes are aligned and are designated by the reference numeral 53.

The conveyed and sorted packages 14 emerge from the ends 54 of the discharge chutes 51 where the packages can be either collected in a removable accumulation box (not shown) or can be deflected downward by means of a deflector (not shown) to be collected in a collection bag (not shown) as will be apparent to those skilled in the art.

The inventor has discovered that there is a minimum conveying angle to insure that packages moving under the force of gravity in sections III, IV and V will flow freely and continuously. This angle is 25° as indicated by numeral 43 in FIG. 4.

It will thus be seen that the present invention provides a new and useful conveyorized sorting and distribution apparatus which overcomes the problems of the prior art. The apparatus of the present invention introduces a six-position adjustable divider plate that allows for the creation of a custom groove in the belt to prevent jamming of flimsy envelope packaging material. This system of adjustment also allows for one common belt and driving means to be used to convey multiple packages simultaneously.

The conveyor end divider transition section of the present invention makes possible the transition from the powered conveyor section to the gravity distribution transition section without jamming and allows steel materials to be used in the construction of the apparatus. This section also has the unique feature of access from the underside for maintenance through individually-adjustable access plates.

The distribution transition section allows the maintenance of the proper and optimum angle for conveying. This transition section also allows distribution of the lanes so that equal spacing thereof is possible and identical chutes can be used. This distribution transition section makes possible the simultaneous change in direction in multiple planes.

The use and operation of the conveyorized sorting and distribution system of the present invention will be apparent to those skilled in the art. In general, packages 14 will be placed on the belt 12 in the particular lane related to the destination of the package which will be conveyed in the direction of the arrow 15. The package will proceed in the direction of the arrow 15 along the infeed conveyor 10 onto the inclined conveyor 20 where it will proceed in the direction of the arrow 25 to the conveyor end divider transition section 30 where it will flow by gravity to the distribution transition section 40 where it continues to flow under the force of gravity and through the distribution transition chutes 41 and finally to the discharge chutes 51 to the receptacles at the ends thereof.

Although the invention has been described and illustrated with respect to a preferred embodiment thereof, it is not to be so limited since changes and modifications may be made therein which are within the full intended scope of the invention.

What is claimed is:

1. Apparatus for sorting, conveying, and distributing packages comprising:
    (a) An infeed conveyor having a belt which defines a package-supporting conveyor surface
    (b) An inclined conveyor having a belt defining a package-supporting conveyor surface, said inclined conveyor being positioned in tandem and inclined with respect to said infeed conveyor;
    (c) A divider plate assembly mounted above said infeed and inclined conveyors and having a plurality of divider plates extending longitudinally above said conveyor belts to divide said conveyor belts into a plurality of sort lanes: said divider plates being vertically adjustable with respect to said conveyor belts whereby said plates may be lowered to contact said conveyor belts to machine grooves therein;
    (d) Conveyor end divider transition means having a sort lane aligned with each sort lane on said conveyor belts and positioned at the end of said inclined conveyor to receive packages conveyed thereon, said conveyor end divider transition section functioning to convey by gravity flow packages received from said inclined conveyor;
    (e) Distribution transition means having a sort lane aligned with each sort lane in said conveyor end divider transition means and connected to said conveyor end divider transition means to receive packages conveyed therefrom and to convey by gravity flow such packages in pre-determined directions: and
    (f) Discharge means having a chute aligned with each sort lane in said distribution transition means and connected to said distribution transition means to receive packages conveyed therefrom to convey by gravity flow packages received from said distribution transition section to desired locations.

2. The apparatus for sorting, conveying and distributing packages of claim 1 in which said infeed conveyor belt and said inclined conveyor belt have pre-formed longitudinal grooves therein; and wherein said divider plates are positioned above said longitudinal grooves and are lowered so that the lower edges of said plates fit within said grooves.

3. The apparatus for sorting, conveying and distributing packages of claim 1 wherein said conveyor end divider transition means, said distribution transition means, and said discharge means are designed to provide a minimum angle of 25° for the gravity fall of said packages.

4. The apparatus for sorting, conveying and distributing packages of claim 1 wherein each sort lane in said conveyor end divider transition means contains an access plate which may be opened to expose said sort lane.

5. The apparatus of claim 1 wherein said divider plate assembly comprises divider plates which are capable of vertical, horizontal and longitudinal movement with respect to said conveyor surfaces.

6. The apparatus of claim 1 wherein said discharge chutes deflect, align and stack each package in the same manner for speed of subsequent handling and recognition of the packages.

* * * * *